(12) United States Patent
Sunaga et al.

(10) Patent No.: US 8,767,321 B2
(45) Date of Patent: Jul. 1, 2014

(54) IMAGING LENS AND IMAGING APPARATUS

(75) Inventors: Toshihiro Sunaga, Kanagawa (JP);
Motoyuki Otake, Saitama (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 13/533,370

(22) Filed: Jun. 26, 2012

(65) Prior Publication Data
US 2013/0033763 A1 Feb. 7, 2013

(30) Foreign Application Priority Data
Aug. 4, 2011 (JP) ................................. 2011-171295

(51) Int. Cl.
G02B 9/62 (2006.01)
G02B 3/02 (2006.01)

(52) U.S. Cl.
CPC ....................................... *G02B 9/62* (2013.01)

USPC .......................................... 359/761; 359/713

(58) Field of Classification Search
USPC ................................................. 359/713, 761
See application file for complete search history.

(56) References Cited

FOREIGN PATENT DOCUMENTS

| JP | 06-337348 | 12/1994 |
| JP | 2009-058651 | 3/2009 |
| JP | 2010-191069 A | 9/2010 |

*Primary Examiner* — Jack Dinh
(74) *Attorney, Agent, or Firm* — Rader, Fishman & Grauer PLLC

(57) ABSTRACT

Provided is an imaging lens including a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

6 Claims, 10 Drawing Sheets

IMAGING LENS AND IMAGING APPARATUS

BACKGROUND

The present technology relates to an imaging lens and an imaging apparatus, and more particularly, to an imaging lens having a photographing field angle of about 40° to about 90° and an F number of 2.8 or less so that brightness is achieved and an imaging apparatus including the imaging lens.

As imaging lenses installed in imaging apparatuses such as cameras, for example, imaging lenses for lens-interchangeable camera systems, there are plural types of imaging lenses having a photographing field angle of about 40° to about 90° and an F number of 2.8 or less so that brightness is achieved. For example, Gauss type lenses are widely known (for example, see Japanese Unexamined Patent Application Publication No. 6-337348 and Japanese Unexamined Patent Application Publication No. 2009-58651). In Gauss type lenses, the entire lens system or some lens groups are moved in an optical axis direction in focusing.

As an imaging lens other than the Gauss type lens, an imaging lens which includes a first lens group having a negative refractive power and a second lens group having a positive refractive power and in which the second lens group is moved in an optical axis direction in focusing has been suggested (for example, see Japanese Unexamined Patent Application Publication No. 2010-191069).

SUMMARY

In recent years, lens-interchangeable digital cameras have rapidly come into wide use. In particular, since a lens-interchangeable camera can photograph a moving image as in a video camera or the like, it is necessary to provide an imaging lens suitable for photographing not only still images but also moving images. To perform photographing on a moving image, it is necessary to move a lens group performing focusing at a high speed in order to follow rapid movement of a subject.

To photograph a moving image, an imaging lens which has a photographing field angle of about 40° to about 90° and an F number of 2.8 or less so that brightness is achieved necessarily has a function of moving a lens group at a high speed when performing the focusing.

As described above, Japanese Unexamined Patent Application Publication No. 6-337348 and Japanese Unexamined Patent Application Publication No. 2009-58651 have suggested Gauss type lenses as an imaging lens in which the entire lens system is moved in an optical axis direction while focusing.

However, when the entire lens system is moved at a high speed to photograph a moving image in the focusing, there is a problem that a lens tube may be increased in size since the lens group (the entire lens system) performing the focusing has a heavy weight and an actuator moving the lens group is thus increased in size.

The imaging lens disclosed in Japanese Unexamined Patent Application Publication No. 2010-191069 includes the first lens group having a negative refractive power and the second lens group having a positive refractive power from an object. As described above, the second lens group is moved in the optical direction while focusing.

However, when the second lens group is moved at a high speed to photograph a moving image while focusing, there is a problem that a lens tube may be increased in size since the second lens group performing the focusing has a heavy weight and an actuator moving the lens group is increased in size.

It is desirable to provide an imaging lens and an imaging apparatus that are miniaturized and perform high-speed focusing according to embodiments of the present technology.

According to an embodiment of the present technology, there is provided an imaging lens including a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

Accordingly, in the imaging lens, a single lens is moved in an optical axis direction to perform focusing.

In the imaging lens according to the embodiment of the present technology, in the positive lens of the sixth lens group, a curvature of a surface on the image side may be greater than a curvature of a surface on the object side.

Since the curvature of the surface on image side is greater than the curvature of the surface on the object side in the positive lens of the sixth lens group, a spherical aberration can be suppressed from occurring.

In the imaging lens according to the embodiment of the present technology, at least one surface of the positive lens of the fourth lens group may be aspheric.

Since at least one surface of the positive lens of the fourth lens group is aspheric, a spherical aberration is corrected by the aspheric surface of the positive lens.

In the imaging lens according to the embodiment of the present technology, in the negative lens of the fifth lens group, a curvature of a surface on the image side may be greater than a curvature of a surface on the object side.

Since the curvature of the surface on the image side is greater than the curvature of the surface on the object side in the negative lens of the fifth lens group, a spherical aberration can be suppressed from occurring.

In the imaging lens according to the embodiment of the present technology, a lens closest to the object side may be a negative meniscus lens.

Since the lens closest to the object side is the negative meniscus lens, the same aberration correction is performed from an on-axis to an off-axis.

According to another embodiment of the present technology, there is provided an imaging apparatus including: an imaging lens; and an imaging element that converts an optical image formed by the imaging lens into an electric signal. The imaging lens includes a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

In the imaging apparatus, the focusing is performed by moving a single lens of the imaging lens in the optical axis direction.

It is possible to provide the imaging lens and the imaging apparatus that are miniaturized and perform high-speed focusing according to the embodiments of the present technology.

DETAILED DESCRIPTION OF THE EMBODIMENTS

Figure 1:
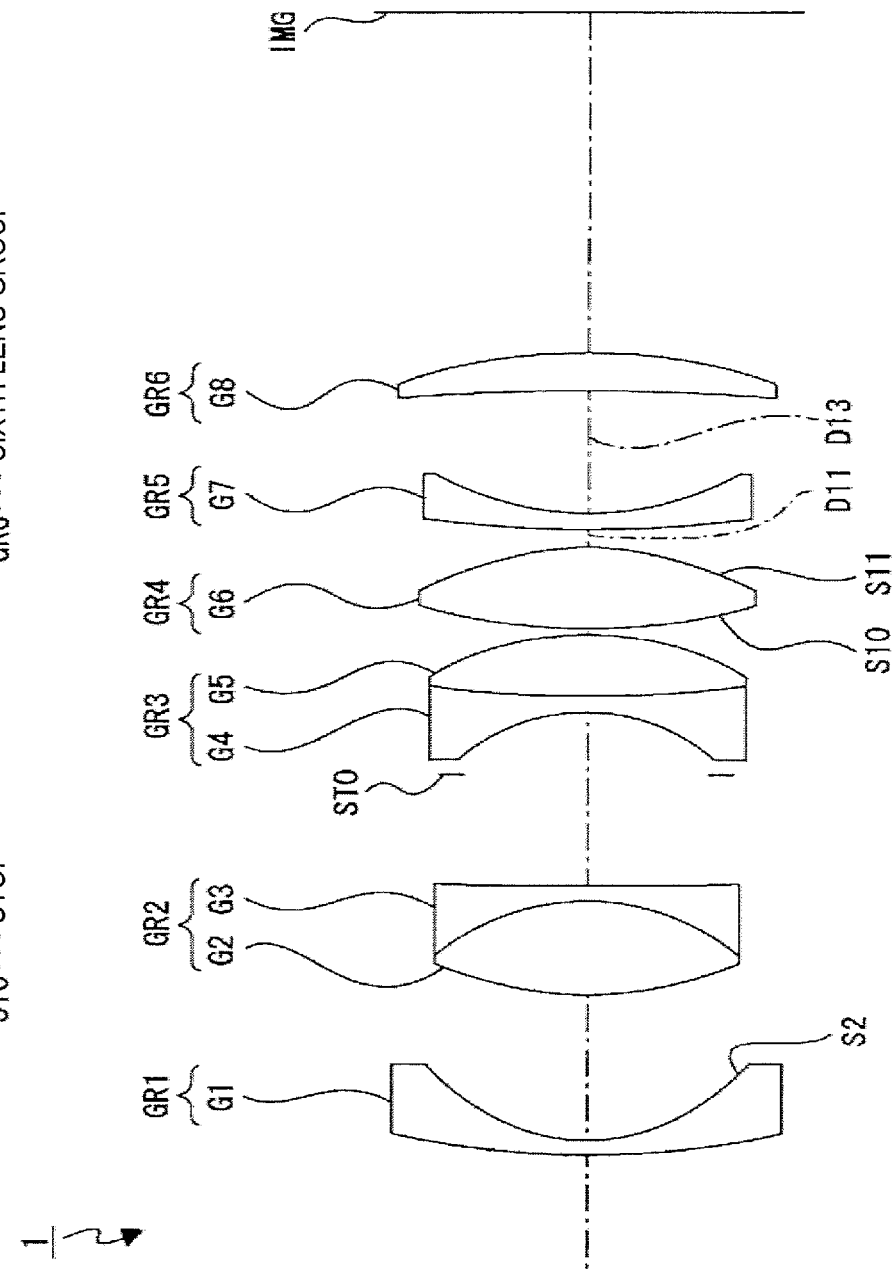
FIG. 1 is a diagram illustrating an imaging lens and an imaging apparatus together with FIGS. 2 to 10 according to a preferred embodiment of the present technology and is a diagram illustrating the configuration of an imaging lens according to a first embodiment.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, an imaging lens and an imaging apparatus according to preferred embodiments of the present technology will be described.
Configuration of Imaging Lens An imaging lens according to an embodiment of the present technology includes a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

In the imaging lens according to the embodiment of the present technology, the first lens group having the negative refractive power and the second lens group having the positive refractive power serve as wide converters, and thus correct a distortion aberration or a coma aberration. With regard to the light passing through the second lens group via the stop, a chromatic aberration is corrected by the cemented lens of the third lens group and a spherical aberration is corrected by the positive lens of the fourth lens group. Since the light passing through the fourth lens group is reduced (converges) by the positive lens of the sixth lens group via the fifth lens group serving as the focus group and including the negative lens group, a change in an image plane in the focusing is suppressed.

Since the main aberrations are corrected by the first to fourth lens groups, the role of the focus group which is the fifth lens group can be reduced. Accordingly, the focus group can be configured by a single lens. Thus, since the weight of the focus group (the fifth lens group) can be reduced, high-speed focusing can be performed.

In the imaging lens according to the embodiment of the present technology, the fifth lens group is configured by a single lens. Therefore, the entire optical length can be shortened and the miniaturization can be achieved.

In the imaging lens according to the embodiment of the present technology, the fifth lens group serving as the focus lens group and configured by a single lens is moved in the optical axis direction. Therefore, since the weight of the lens group performing the focusing is reduced and an actuator moving the lens group is miniaturized, a lens tube can be miniaturized.

In the imaging lens according to the embodiment of the present technology, each of the fourth, fifth, and sixth lens groups is configured by a single lens. Therefore, the entire optical length can be shortened and the miniaturization can be achieved.

In the imaging lens according to the embodiment of the present technology, as described above, the miniaturization can be ensured and high-speed focusing can thus be performed.

In the imaging lens according to the embodiment of the present technology, in the positive lens of the sixth lens group, the curvature of a surface on the image side may be greater than the curvature of a surface on the object side.

When the curvature of the surface on the image side is less than the curvature of the surface on the object side, it is difficult to suppress a change in the field curvature in the focusing. Accordingly, when the curvature of the surface on the image side is configured to be greater than the curvature of the surface on the object in the positive lens of the sixth lens group, the change in the field curvature in the focusing can be suppressed and image quality can be improved.

In the imaging lens according to the embodiment of the present technology, at least one surface of the positive lens of the fourth lens group may be aspheric.

When the positive lens of the fourth lens group is formed as an aspheric surface, the spherical aberration can be satisfactorily corrected.

In the imaging lens according to the embodiment of the present technology, in the negative lens of the fifth lens group, the curvature of a surface on the image side may be greater than the curvature of a surface on the object side.

When the curvature of the surface on the image side is less than the curvature of the surface on the object side, a spherical aberration easily occurs. Accordingly, when the curvature of the surface on the image side is configured to be greater than the curvature of the surface on the object in the negative lens of the fifth lens group, the spherical aberration can be suppressed from occurring and image quality can thus be improved.

In the imaging lens according to the embodiment of the present technology, a lens closest to the object side may be a negative meniscus lens.

When the lens closest to the object side is configured as the negative meniscus lens, the same aberration correction is performed from an on-axis to an off-axis.

Numerical Example of Imaging Lens

Hereinafter, an imaging lens according to a specific embodiment of the present technology and a numerical example in which specific numerical values are applied to the imaging lens according to the embodiment will be described with reference to the drawings and tables.

Further, the meanings of signs used in each table or description are as follows.

"Si" denotes a surface number of an $i^{th}$ surface numbered from the object side to the image side, "Ri" denotes a paraxial radius of curvature of an $i^{th}$ surface, "Di" denotes an on-axis surface distance (thickness or air gap of the center of a lens) between an $i^{th}$ surface and an $i+1^{th}$ surface, "Nd" denotes a refractive index of a line d ($\lambda$=587.6 nm) of a lens or the like starting from an $i^{th}$ surface, and "vd" denotes an Abbe number of the line d of a lens or the like starting from an $i^{th}$ surface.

"ASP" denotes an aspheric surface of a corresponding surface in association with "Si," "STO" denotes a stop in association with "Si," and "inf" denotes the fact that the corresponding surface is flat in association with "Ri."

"k" is a cone constant (conic constant) and "A4," "A6," "A8," and "A10" denote fourth, sixth, eighth, and tenth order aspheric coefficients, respectively.

"Fno" denotes an F number, "f" denotes a focal distance, "ω" denotes a half field angle, and "β" denotes a photographing magnification.

In each table that shows the following aspheric coefficients, "E-n" indicates an exponential notation in which 10 is the base, that is, "10 to the negative $n^{th}$ power." For example, "0.12345E-0.5" indicates "0.12345×(10 to the negative $5^{th}$ power)."

In an imaging lens described in each embodiment, some of the lens surfaces are aspheric. On the assumption that "x" is a distance (sag amount) from the apex of a lens surface in an optical axis direction, "y" is a height (image height) in a direction perpendicular to the optical axis direction, "c" is a paraxial curvature (the reciprocal of a radius of curvature) in the apex of a lens, "k" is a cone constant (cone constant), and "A4," "A6," "A8," and "A10" are the fourth, sixth, eighth, and tenth order aspheric coefficients, respectively, the shape of an aspheric surface is defined as in Equation 1 below.

$$x = \frac{y^2 \cdot c^2}{1+[1-(1+\kappa) \cdot y^2 \cdot c^2]^{1/2}} + \sum Ai \cdot y^i \quad \text{[Equation 1]}$$

First Embodiment

FIG. 1 is a diagram illustrating the configuration of an imaging lens 1 according to a first embodiment of the present technology.

The imaging lens 1 includes a first lens group GR1 having a negative refractive power, a second lens group GR2 having a positive refractive power, a stop STO, a third lens group GR3 having a negative refractive power, a fourth lens group GR4 having a positive refractive power, a fifth lens group GR5 serving as a focus group and having a negative refractive power, and a sixth lens group GR6 having a positive refractive power that are arranged sequentially from an object side to an image side.

The first lens group GR1 is fixed and includes a negative lens G1 having a convex surface of a meniscus shape on the object side.

The second lens group GR2 is fixed and includes a cemented lens in which a positive lens G2 located on the object side and having a biconvex shape and a negative lens G3 located on the image side and having a biconcave shape are cemented to one another.

The stop STO is disposed between the second lens group GR2 and the third lens group GR3 and is fixed in the vicinity of the third lens group GR3.

The third lens group GR3 is fixed and includes a cemented lens in which a negative lens G4 located on the object side and having a biconcave shape and a positive lens G5 located on the image side and having a biconvex shape are cemented to one another.

The fourth lens group GR4 is fixed and includes a positive lens G6 having a biconvex shape.

The fifth lens group GR5 can be moved in the optical axis direction and includes a negative lens G7 having a convex surface of a meniscus shape on the object side. In the negative lens G7, the curvature of the surface on the image side is greater than the curvature of the surface on the object side, and the absolute value of a radius of curvature (R13) of the surface on the image side is less than the absolute value of a radius of curvature (R12) of the surface on the object side.

The sixth lens group GR6 is fixed and includes a positive lens G8 having a concave surface of a meniscus shape on the object side. In the positive lens G8, the curvature of the surface on the image side is greater than the curvature of the surface on the object side, and the absolute value of a radius of curvature (R15) of the surface on the image side is less than the absolute value of a radius of curvature (R14) of the surface on the object side.

Between the six lens group GR6 and an image plane IMG, a filter and a cover glass (neither of which is shown) are arranged sequentially from the object side to the image side.

Table 1 shows lens data of Numerical Example 1 in which specific numerical values are applied to the imaging lens 1 according to the first embodiment.

TABLE 1

| Si | Ri | Di | Nd | vd |
|---|---|---|---|---|
| 1 | 60.767 | 1.000 | 1.592 | 67.02 |
| 2 (ASP) | 13.000 | 9.494 | | |
| 3 | 24.997 | 6.168 | 1.702 | 41.15 |
| 4 | −15.000 | 1.000 | 1.581 | 40.89 |
| 5 | 353.241 | 7.246 | | |
| 6 (STO) | Inf | 4.189 | | |
| 7 | −12.629 | 1.000 | 1.755 | 27.53 |
| 8 | 73.136 | 3.992 | 1.697 | 55.46 |
| 9 | −21.769 | 0.400 | | |
| 10 (ASP) | 35.061 | 5.338 | 1.729 | 54.04 |
| 11 (ASP) | −19.909 | D11 | | |
| 12 | 82.632 | 1.000 | 1.658 | 50.85 |
| 13 | 19.848 | D13 | | |
| 14 | −181.937 | 2.410 | 1.743 | 49.22 |
| 15 | −40.696 | 22.418 | | |

In the imaging lens 1, the surface (second surface) of the negative lens G1 of the first lens group GR1 on the image side and both surfaces (tenth and eleventh surfaces) of the positive lens G6 of the fourth lens group GR4 are formed as aspheric surfaces. In Numerical Example 1, fourth, sixth, eighth, and tenth order aspheric coefficients A4, A6, A8, and A10 of aspheric surfaces are shown together with cone constants k in Table 2.

TABLE 2

| Si | κ | A4 | A6 | A8 | A10 |
|---|---|---|---|---|---|
| 2 | 0.00000 | −2.07814E−05 | −3.27275E−08 | −8.78079E−10 | 2.91712E−12 |
| 10 | 0.00000 | −1.81141E−05 | 1.70706E−08 | 0.00000E+00 | 0.00000E+00 |
| 11 | 0.00000 | 3.63456E−05 | −4.12128E−08 | 1.75176E−10 | 1.23060E−13 |

Table 3 shows an F number Fno, a focal distance f, a half field angle ω, photographing magnifications β at an infinite focusing time and a short-range focusing time, and variable distances (D11 and D13) when the fifth lens group GR5 is moved in Numerical Example 1.

TABLE 3

| | INFINITE FOCUSING TIME | SHORT-RANGE FOCUSING TIME |
|---|---|---|
| Fno | 1.84 | — |
| f | 23.28 | — |
| ω | 30.97 | — |
| β | 0.000 | −0.25 |
| D11 | 1.257 | 5.400 |
| D13 | 8.087 | 3.945 |

Figure 2:
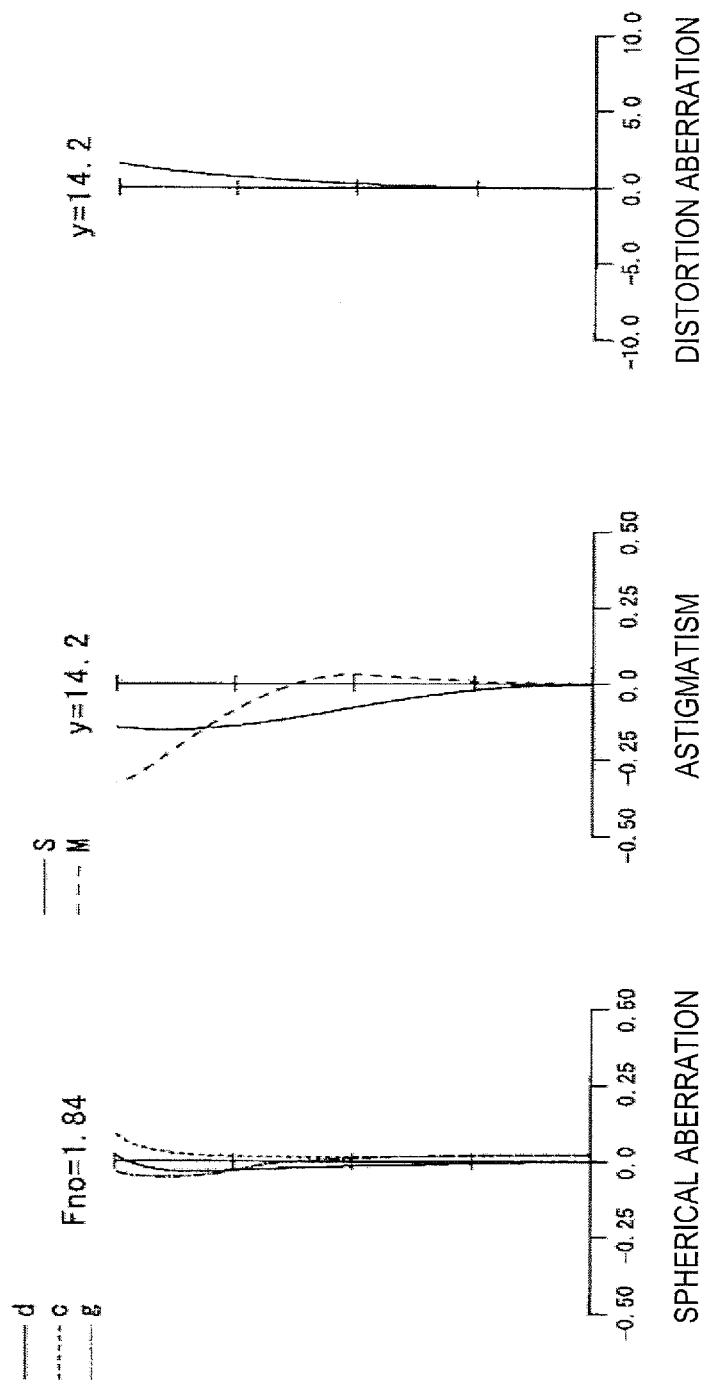
FIG. 2 is a diagram illustrating aberrations in a numerical example in which specific numerical values are applied to the imaging lens together with FIG. 3 according to the first embodiment and is a diagram illustrating a spherical aberration, an astigmatism, and a distortion aberration at an infinite focusing time.
Figure 3:
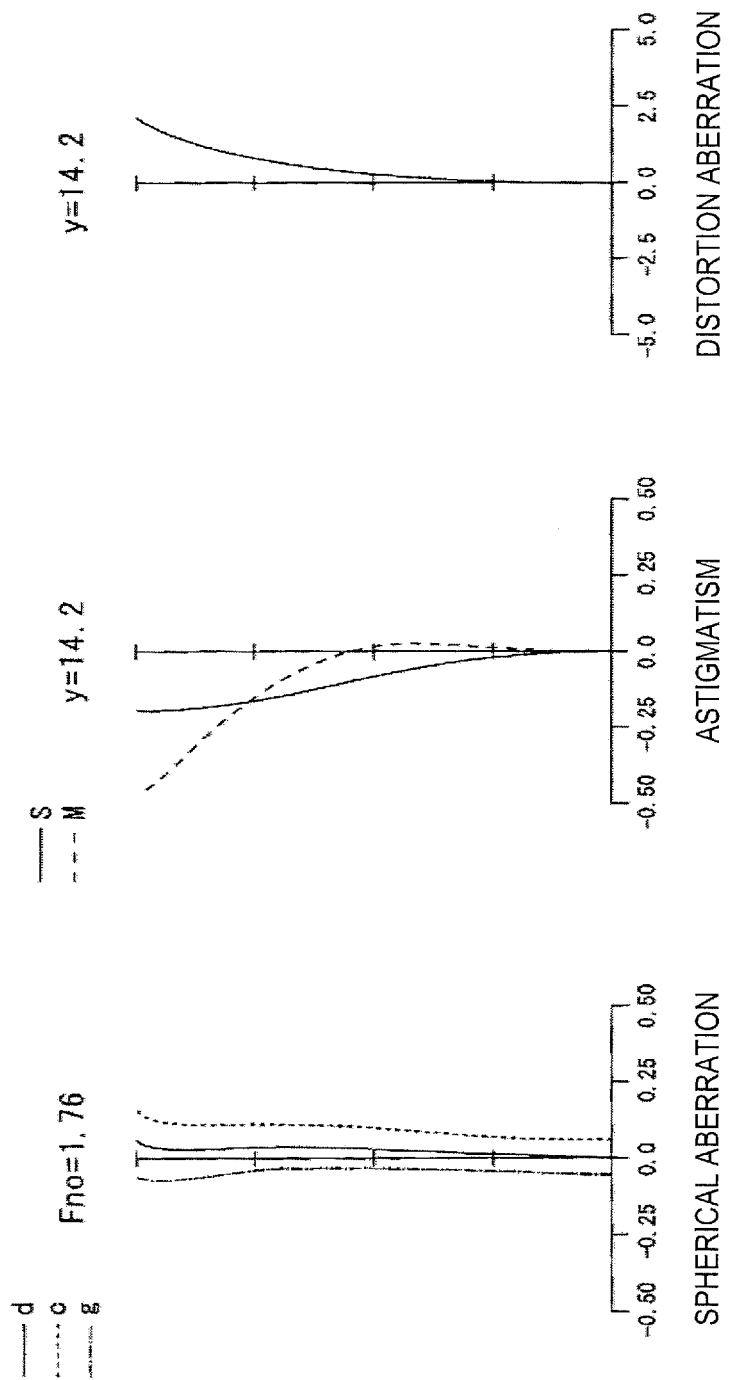
FIG. 3 is a diagram illustrating a spherical aberration, an astigmatism, and a distortion aberration at a short-range focusing time.

In FIGS. 2 and 3, various aberrations of Numerical Example 1 are shown. FIG. 2 shows various aberrations at the infinite focusing time and FIG. 3 shows various aberrations at the short-range focusing time (β=−0.25).

In spherical aberration diagrams of FIGS. 2 and 3, the value of a line d (with a wavelength of 587.6 nm) is indicated by a solid line, the value of a line c (with a wavelength of 656.3 nm) is indicated by a dotted line, and the value of a line g (with a wavelength of 435.8 nm) is indicated by a one-dot chain line. Further, in astigmatism diagrams of FIGS. 2 and 3, a value on a sagittal image plane is indicated by a solid line and a value on a meridional image plane is indicated by a dashed line.

From the aberration diagrams, it is apparent that various aberrations are satisfactorily corrected and excellent imaging performance is realized in Numerical Example 1.

Second Embodiment

Figure 4:
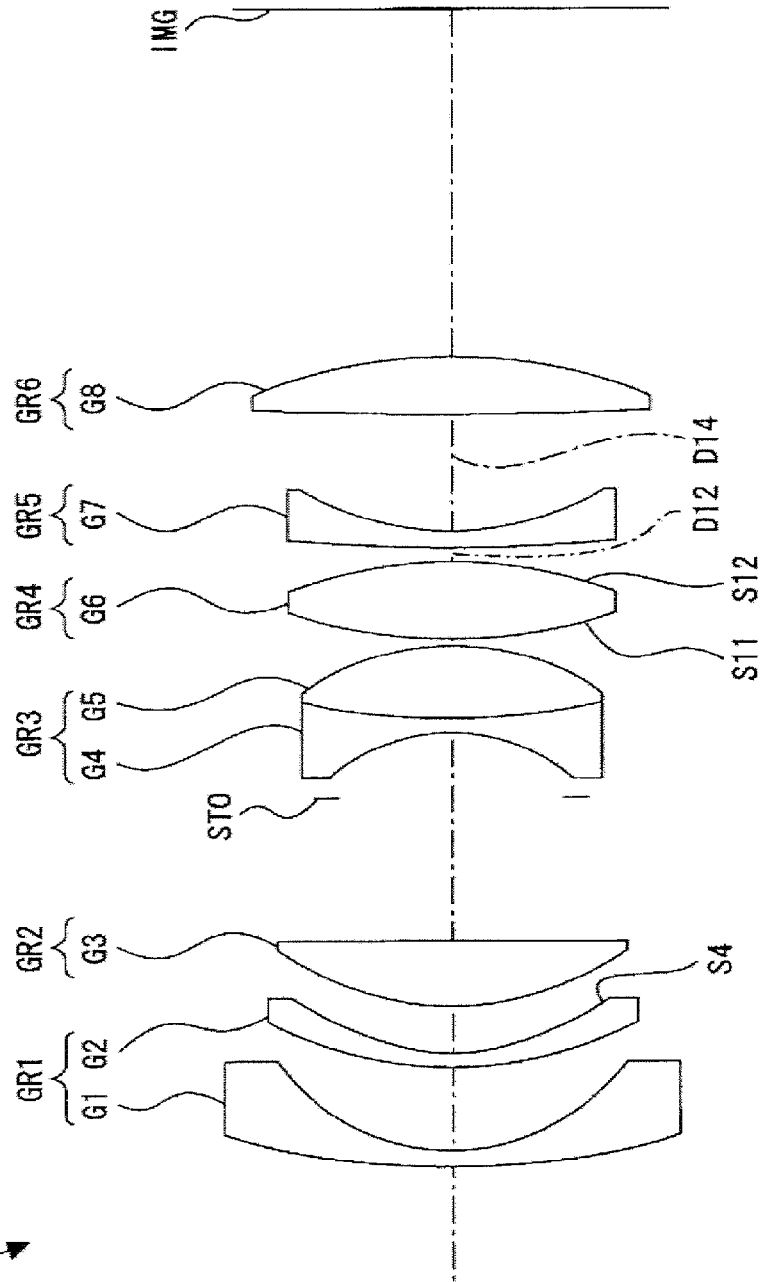
FIG. 4 is a diagram illustrating the configuration of an imaging lens according to a second embodiment.

FIG. 4 is a diagram illustrating the configuration of an imaging lens 2 according to a second embodiment of the present technology.

The imaging lens 2 includes a first lens group GR1 having a negative refractive power, a second lens group GR2 having a positive refractive power, a stop STO, a third lens group GR3 having a negative refractive power, a fourth lens group GR4 having a positive refractive power, a fifth lens group GR5 serving as a focus group and having a negative refractive power, and a sixth lens group GR6 having a positive refractive power that are arranged sequentially from an object side to an image side.

The first lens group GR1 is fixed and includes a negative lens G1 having a convex surface of a meniscus shape on the object side and a negative lens G2 having a convex surface of a meniscus shape on the object side that are arranged sequentially from the object side to the image side.

The second lens group GR2 is fixed and includes a negative lens G3 having a convex surface of a meniscus shape on the object side.

The stop STO is disposed between the second lens group GR2 and the third lens group GR3 and is fixed in the vicinity of the third lens group GR3.

The third lens group GR3 is fixed and includes a cemented lens in which a negative lens G4 located on the object side and having a biconcave shape and a positive lens G5 located on the image side and having a biconvex shape are cemented to one another.

The fourth lens group GR4 is fixed and includes a positive lens G6 having a biconvex shape.

The fifth lens group GR5 can be moved in the optical axis direction and includes a negative lens G7 having a convex surface of a meniscus shape on the object side. In the negative lens G7, the curvature of the surface on the image side is greater than the curvature of the surface on the object side, and the absolute value of a radius of curvature (R14) of the surface on the image side is less than the absolute value of a radius of curvature (R13) of the surface on the object side.

The sixth lens group GR6 is fixed and includes a positive lens G8 having a biconvex surface. In the positive lens G8, the curvature of the surface on the image side is greater than the curvature of the surface on the object side, and the absolute value of a radius of curvature (R16) of the surface on the image side is less than the absolute value of a radius of curvature (R15) of the surface on the object side.

Between the sixth lens group GR6 and an image plane IMG, a filter and a cover glass (neither of which is shown) are arranged sequentially from the object side to image side.

Table 4 shows lens data of Numerical Example 2 in which specific numerical values are applied to the imaging lens 2 according to the second embodiment.

TABLE 4

| Si | Ri | Di | Nd | vd |
|---|---|---|---|---|
| 1 | 52.254 | 1.000 | 1.487 | 70.44 |
| 2 | 13.715 | 5.495 | | |
| 3 | 25.387 | 1.000 | 1.589 | 61.25 |
| 4 (ASP) | 14.610 | 3.000 | | |
| 5 | 18.860 | 4.197 | 1.835 | 42.72 |
| 6 | 1119.730 | 9.292 | | |
| 7 (STO) | Inf | 4.238 | | |
| 8 | −11.656 | 1.000 | 1.755 | 27.53 |
| 9 | 45.550 | 4.655 | 1.618 | 63.40 |
| 10 | −16.688 | 0.400 | | |
| 11 (ASP) | 31.808 | 5.000 | 1.801 | 45.45 |
| 12 (ASP) | −26.041 | D12 | | |
| 13 | 138.976 | 1.000 | 1.697 | 55.46 |
| 14 | 20.701 | D14 | | |
| 15 | 344.293 | 3.740 | 1.618 | 63.40 |
| 16 | −33.618 | 22.374 | | |

In the imaging lens 2, the surface (fourth surface) of the negative lens G2 of the first lens group GR1 on the image side and both surfaces (eleventh and twelfth surfaces) of the positive lens G6 of the fourth lens group GR4 are formed as aspheric surfaces. In Numerical Example 2, fourth, sixth5, eighth, and tenth order aspheric coefficients A4, A6, A8, and A10 of aspheric surfaces are shown together with cone constants k in Table 5.

TABLE 5

| Si | κ | A4 | A6 | A8 | A10 |
|---|---|---|---|---|---|
| 4 | 0.00000 | −3.65895E−05 | −2.02766E−07 | 1.66758E−10 | −6.21785E−12 |
| 11 | 0.00000 | −1.28119E−05 | 2.85341E−08 | 0.00000E+00 | 0.00000E+00 |
| 12 | 0.00000 | 2.49503E−05 | −3.18958E−08 | 2.80615E−10 | −6.64956E−13 |

Table 6 shows an F number Fno, a focal distance f, a half field angle ω, photographing magnifications β at an infinite focusing time and a short-range focusing time, and variable distances (D12 and D14) when the fifth lens group GR5 is moved in Numerical Example 2.

TABLE 6

|  | INFINITE FOCUSING TIME | SHORT-RANGE FOCUSING TIME |
|---|---|---|
| Fno | 1.85 | — |
| f | 23.28 | — |
| ω | 30.86 | — |
| β | 0.000 | −0.25 |
| D12 | 1.005 | 5.133 |
| D14 | 7.603 | 3.474 |

Figure 5:
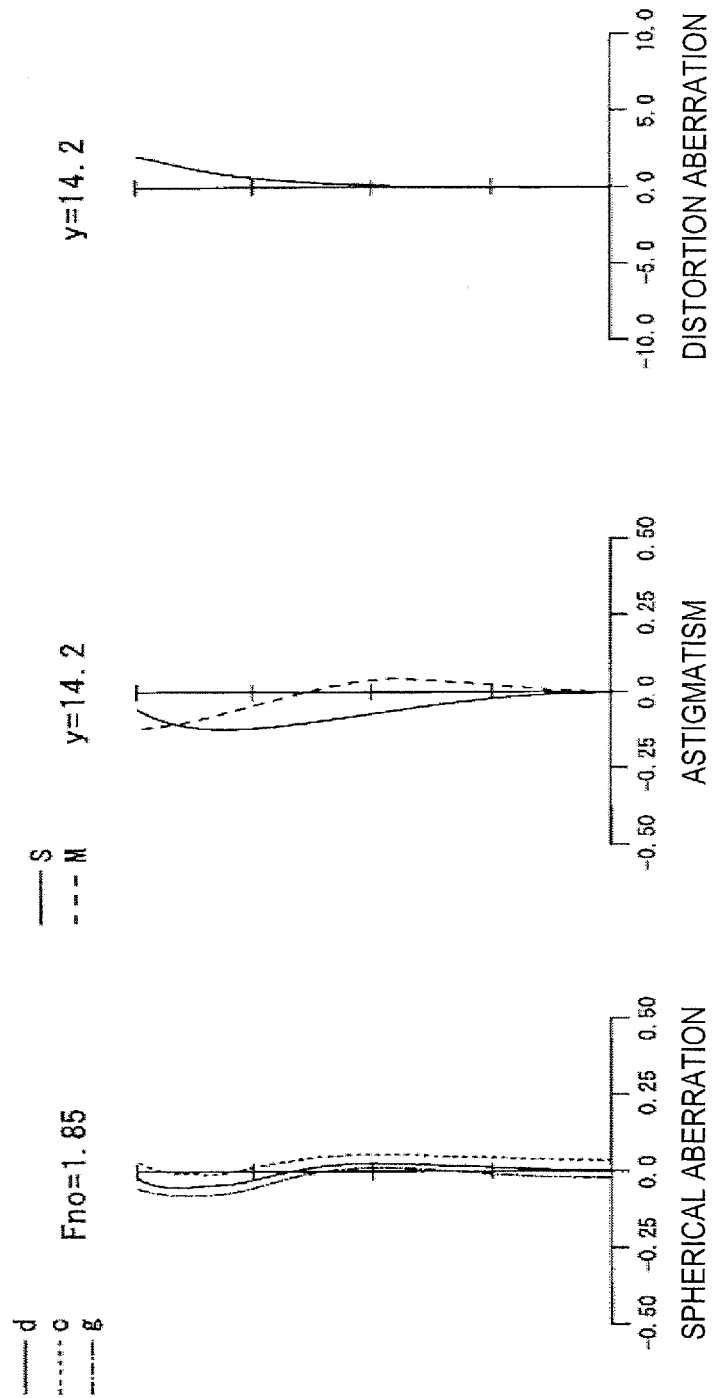
FIG. 5 is a diagram illustrating aberrations in a numerical example in which specific numerical values are applied to the imaging lens together with FIG. 6 according to the second embodiment and is a diagram illustrating a spherical aberration, an astigmatism, and a distortion aberration at an infinite focusing time.
Figure 6:
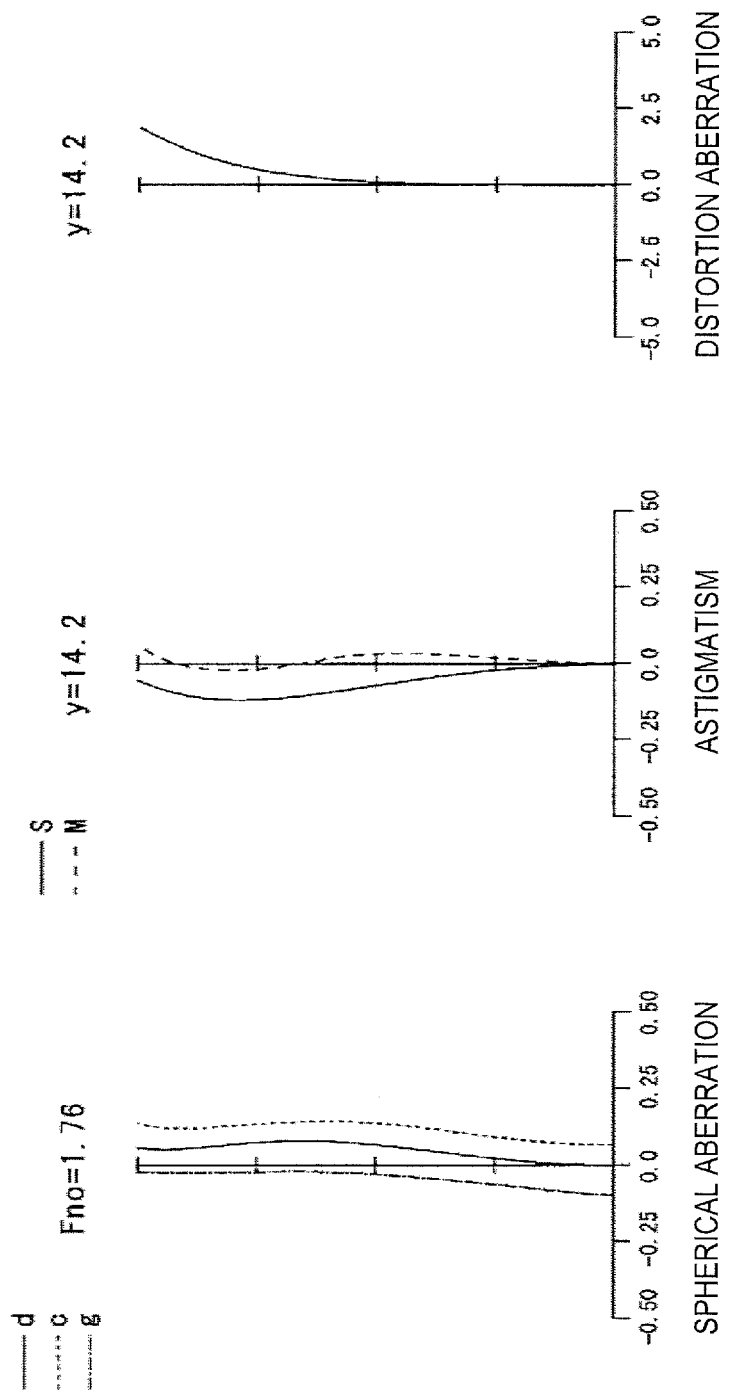
FIG. 6 is a diagram illustrating a spherical aberration, an astigmatism, and a distortion aberration at a short-range focusing time.

In FIGS. 5 and 6, various aberrations of Numerical Example 2 are shown. FIG. 5 shows various aberrations at the infinite focusing time and FIG. 6 shows various aberrations at the short-range focusing time (β=−0.25).

In spherical aberration diagrams of FIGS. 5 and 6, the value of a line d (with a wavelength of 587.6 nm) is indicated by a solid line, the value of a line c (with a wavelength of 656.3 nm) is indicated by a dotted line, and the value of a line g (with a wavelength of 435.8 nm) is indicated by a one-dot chain line. Further, in astigmatism diagrams of FIGS. 5 and 6, a value on a sagittal image plane is indicated by a solid line and a value on a meridional image plane is indicated by a dashed line.

From the aberration diagrams, it is apparent that various aberrations are satisfactorily corrected and excellent imaging performance is realized in Numerical Example 2.

Third Embodiment

Figure 7:
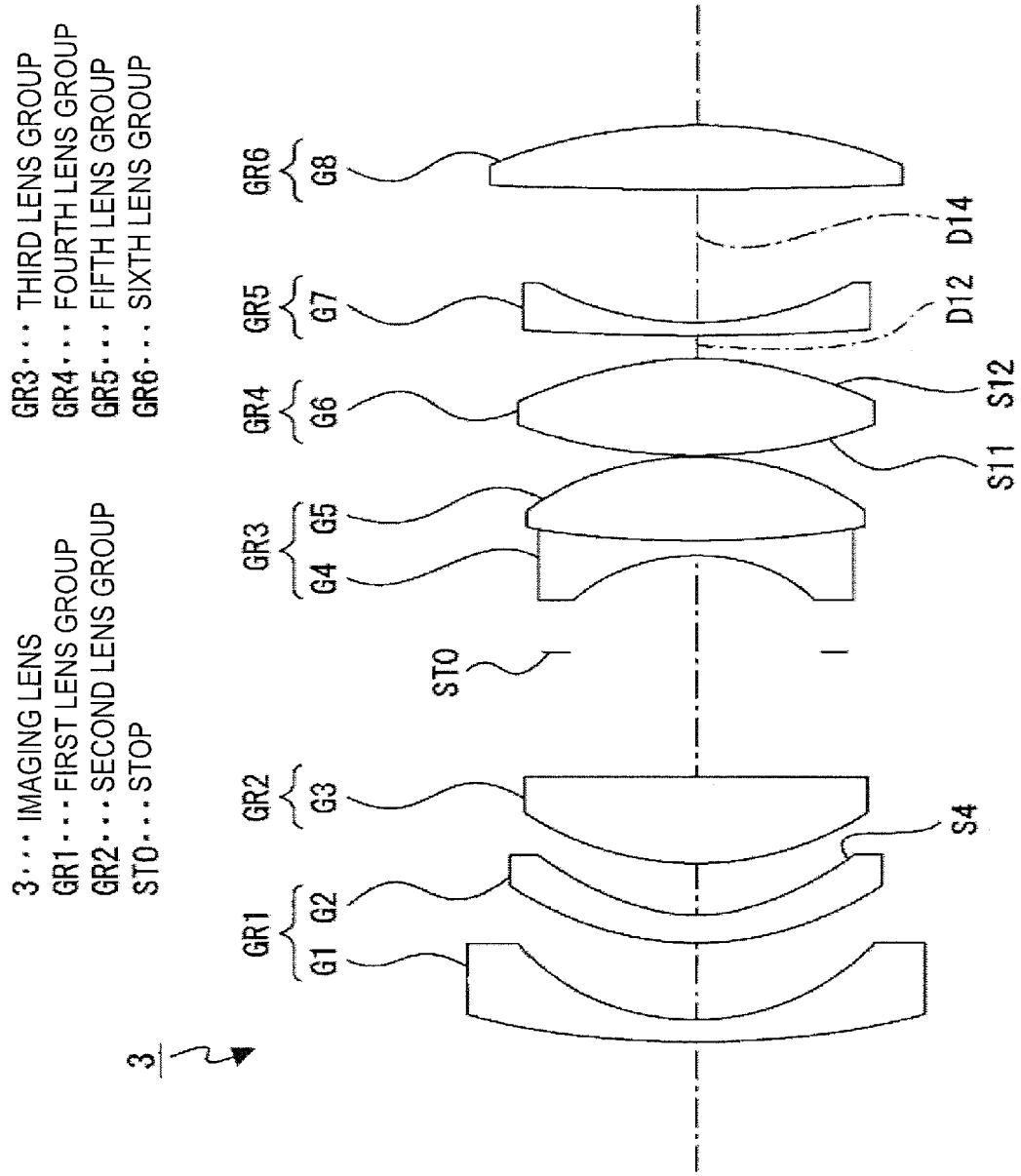
FIG. 7 is a diagram illustrating the configuration of an imaging lens according to a third embodiment.

FIG. 7 is a diagram illustrating the configuration of an imaging lens 3 according to a third embodiment of the present technology.

The imaging lens 3 includes a first lens group GR1 having a negative refractive power, a second lens group GR2 having a positive refractive power, a stop STO, a third lens group GR3 having a negative refractive power, a fourth lens group GR4 having a positive refractive power, a fifth lens group GR5 serving as a focus group and having a negative refractive power, and a sixth lens group GR6 having a positive refractive power that are arranged sequentially from an object side to an image side.

The first lens group GR1 is fixed and includes a negative lens G1 having a convex surface of a meniscus shape on the object side and a negative lens G2 having a convex surface of a meniscus shape on the object side that are arranged sequentially from the object side to the image side.

The second lens group GR2 is fixed and includes a positive lens G3 having a convex surface of a meniscus shape on the object side.

The stop STO is disposed between the second lens group GR2 and the third lens group GR3 and is fixed in the vicinity of the third lens group GR3.

The third lens group GR3 is fixed and includes a cemented lens in which a negative lens G4 located on the object side and having a biconcave shape and a positive lens G5 located on the image side and having a biconvex shape are cemented to one another.

The fourth lens group GR4 is fixed and includes a positive lens G6 having a biconvex shape.

The fifth lens group GR5 can be moved in the optical axis direction and includes a negative lens G7 having a convex surface of a meniscus shape on the object side. In the negative lens G7, the curvature of the surface on the image side is greater than the curvature of the surface on the object side, and the absolute value of a radius of curvature (R14) of the surface on the image side is less than the absolute value of a radius of curvature (R13) of the surface on the object side.

The sixth lens group GR6 is fixed and includes a positive lens G8 having a biconvex surface. In the positive lens G8, the curvature of the surface on the image side is greater than the curvature of the surface on the object side, and the absolute value of a radius of curvature (R16) of the surface on the image side is less than the absolute value of a radius of curvature (R15) of the surface on the object side.

Between the sixth lens group GR6 and an image plane IMG, a filter and a cover glass (neither of which is shown) are arranged sequentially from the object side to image side.

Table 7 shows lens data of Numerical Example 3 in which specific numerical values are applied to the imaging lens 3 according to the third embodiment.

TABLE 7

| Si | Ri | Di | Nd | vd |
|---|---|---|---|---|
| 1 | 91.407 | 2.133 | 1.603 | 60.69 |
| 2 | 23.214 | 7.191 | | |
| 3 | 30.655 | 2.742 | 1.583 | 59.46 |
| 4 (ASP) | 20.038 | 4.936 | | |
| 5 | 29.403 | 8.211 | 1.806 | 40.73 |
| 6 | 1191.821 | 11.731 | | |
| 7 (STO) | inf | 9.141 | | |
| 8 | −17.870 | 1.523 | 1.755 | 27.53 |
| 9 | 112.094 | 7.983 | 1.729 | 54.67 |
| 10 | −28.379 | 0.229 | | |
| 11 (ASP) | 46.170 | 8.927 | 1.694 | 53.20 |
| 12 (ASP) | −34.450 | D12 | | |
| 13 | 229.493 | 1.371 | 1.603 | 60.69 |
| 14 | 30.743 | D14 | | |
| 15 | 761.725 | 6.017 | 1.497 | 81.61 |
| 16 | −52.559 | 33.441 | | |

In the imaging lens 3, the surface (fourth surface) of the negative lens G2 of the first lens group GR1 on the image side and both surfaces (eleventh and twelfth surfaces) of the positive lens G6 of the fourth lens group GR4 are formed as aspheric surfaces. In Numerical Example 3, fourth, sixth, eighth, and tenth order aspheric coefficients A4, A6, A8, and A10 of aspheric surfaces are shown together with cone constants k in Table 5.

TABLE 8

| Si | κ | A4 | A6 | A8 | A10 |
|----|---|----|----|----|-----|
| 2  | 0.00000 | −1.20076E−05 | −3.10742E−08 | 2.52190E−11 | −2.74869E−13 |
| 9  | 0.00000 | −4.35024E−06 | 9.02207E−10  | −1.52015E−11 | −6.85730E−14 |
| 12 | 0.00000 | 9.09927E−06  | −3.60632E−09 | 1.68736E−11 | −6.29845E−14 |

Table 9 shows an F number Fno, a focal distance f, a half field angle ω, photographing magnifications β at an infinite focusing time and a short-range focusing time, and variable distances (D12 and D14) when the fifth lens group GR5 is moved in Numerical Example 3.

TABLE 9

|   | INFINITE FOCUSING TIME | SHORT-RANGE FOCUSING TIME |
|---|---|---|
| Fno | 1.85 | — |
| f | 35.81 | — |
| ω | 30.78 | — |
| β | 0.000 | −0.25 |
| D11 | 2.275 | 8.358 |
| D13 | 12.64 | 6.557 |

Figure 8:
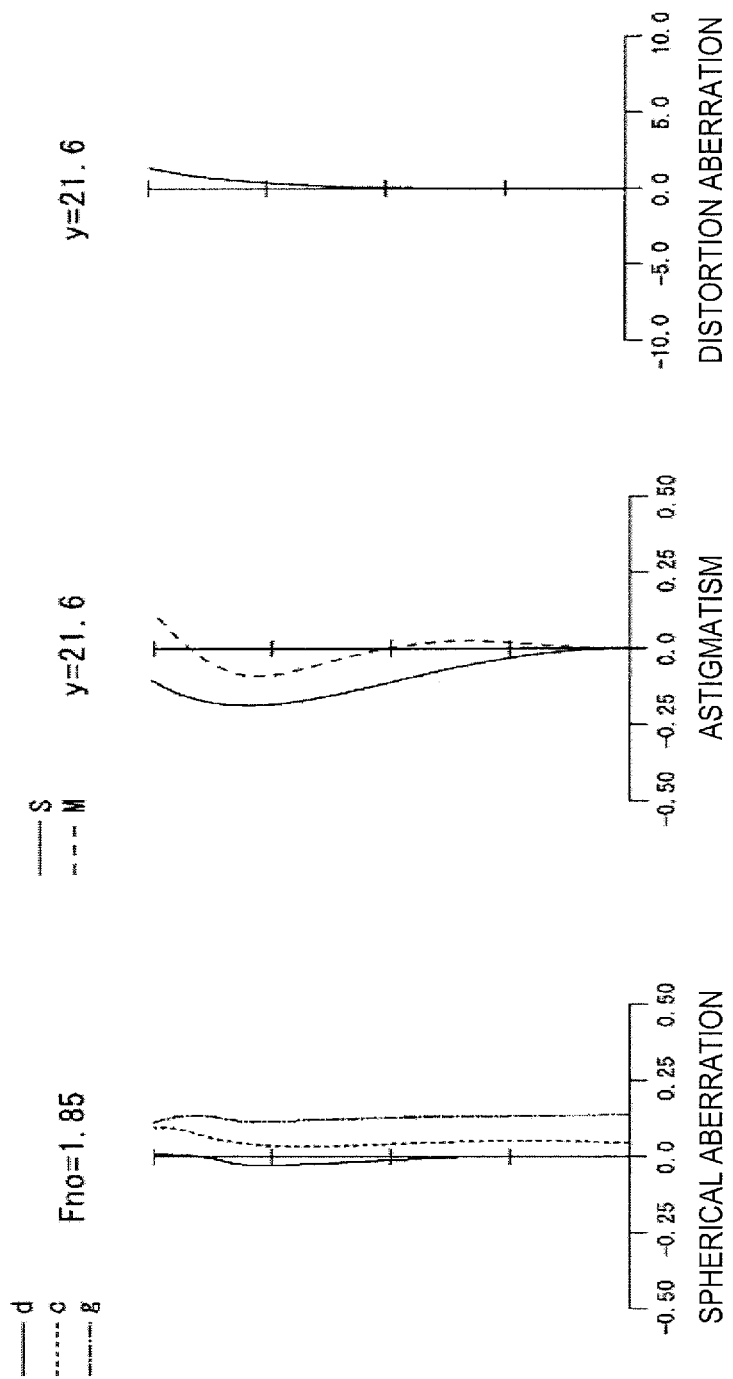
FIG. 8 is a diagram illustrating aberrations in a numerical example in which specific numerical values are applied to the imaging lens together with FIG. 9 according to the third embodiment and is a diagram illustrating a spherical aberration, an astigmatism, and a distortion aberration at an infinite focusing time.
Figure 9:
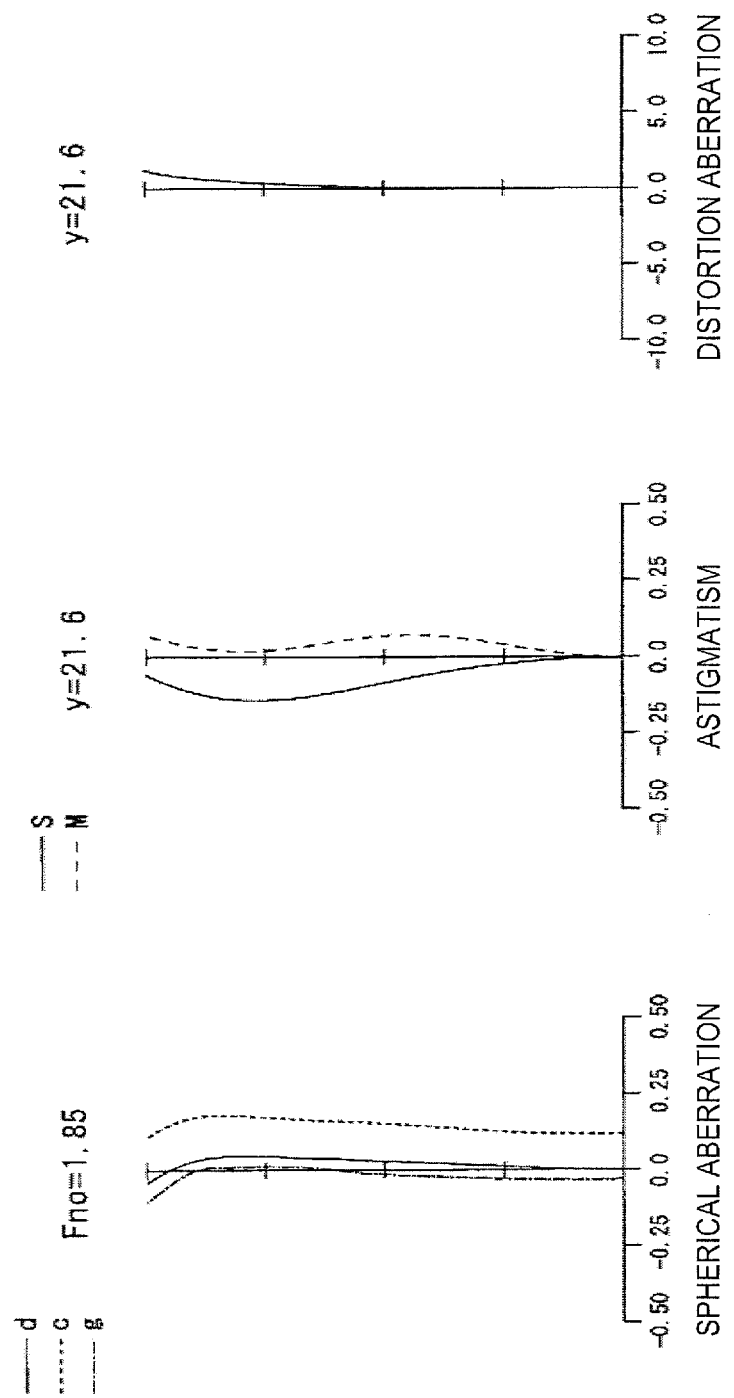
FIG. 9 is a diagram illustrating a spherical aberration, an astigmatism, and a distortion aberration at a short-range focusing time.

In FIGS. 8 and 9, various aberrations of Numerical Example 3 are shown. FIG. 8 shows various aberrations at the infinite focusing time and FIG. 9 shows various aberrations at the short-range focusing time (β=−0.25).

In spherical aberration diagrams of FIGS. 8 and 9, the value of a line d (with a wavelength of 587.6 nm) is indicated by a solid line, the value of a line c (with a wavelength of 656.3 nm) is indicated by a dotted line, and the value of a line g (with a wavelength of 435.8 nm) is indicated by a one-dot chain line. Further, in astigmatism diagrams of FIGS. 8 and 9, a value on a sagittal image plane is indicated by a solid line and a value on a meridional image plane is indicated by a dashed line.

From the aberration diagrams, it is apparent that various aberrations are satisfactorily corrected and excellent imaging performance is realized in Numerical Example 3.

Configuration of Imaging Apparatus

An imaging apparatus according to an embodiment of the present technology includes an imaging lens and an imaging element that converts an optical image formed by the imaging lens into an electric signal. In the imaging lens, a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens are arranged sequentially from an object side to an image side.

In the imaging lens of the imaging apparatus according to the embodiment of the present technology, the first lens group having the negative refractive power and the second lens group having the positive refractive power serve as wide converters, and thus correct a distortion aberration or a coma aberration. With regard to the light passing through the second lens group via the stop, a chromatic aberration is corrected by the cemented lens of the third lens group and a spherical aberration is corrected by the positive lens of the fourth lens group. Since the light passing through the fourth lens group is reduced (converges) by the positive lens of the sixth lens group via the fifth lens group serving as the focus group and including the negative lens group, a change in an image plane in the focusing is suppressed.

Since the main aberrations are corrected by the first to fourth lens groups, the role of the focus group which is the fifth lens group can be reduced. Accordingly, the focus group can be configured by a single lens. Thus, since the weight of the focus group (the fifth lens group) can be reduced, high-speed focusing can be performed.

In the imaging lens of the imaging apparatus according to the embodiment of the present technology, the fifth lens group is configured by a single lens. Therefore, the entire optical length can be shortened and the miniaturization can be achieved.

In the imaging lens of the imaging apparatus according to the embodiment of the present technology, the fifth lens group serving as a focus lens group and configured by a single lens is moved in the optical axis direction. Therefore, since the weight of the lens group performing the focusing is reduced and an actuator moving the lens group is miniaturized, a lens tube can be miniaturized.

In the imaging lens of the imaging apparatus according to the embodiment of the present technology, each of the fourth, fifth, and sixth lens groups is configured by a single lens. Therefore, the entire optical length can be shortened and the miniaturization can be achieved.

In the imaging apparatus according to the embodiment of the present technology, as described above, the miniaturization can be ensured and high-speed focusing can thus be performed by the lens.

Embodiment of Imaging Apparatus

Figure 10:
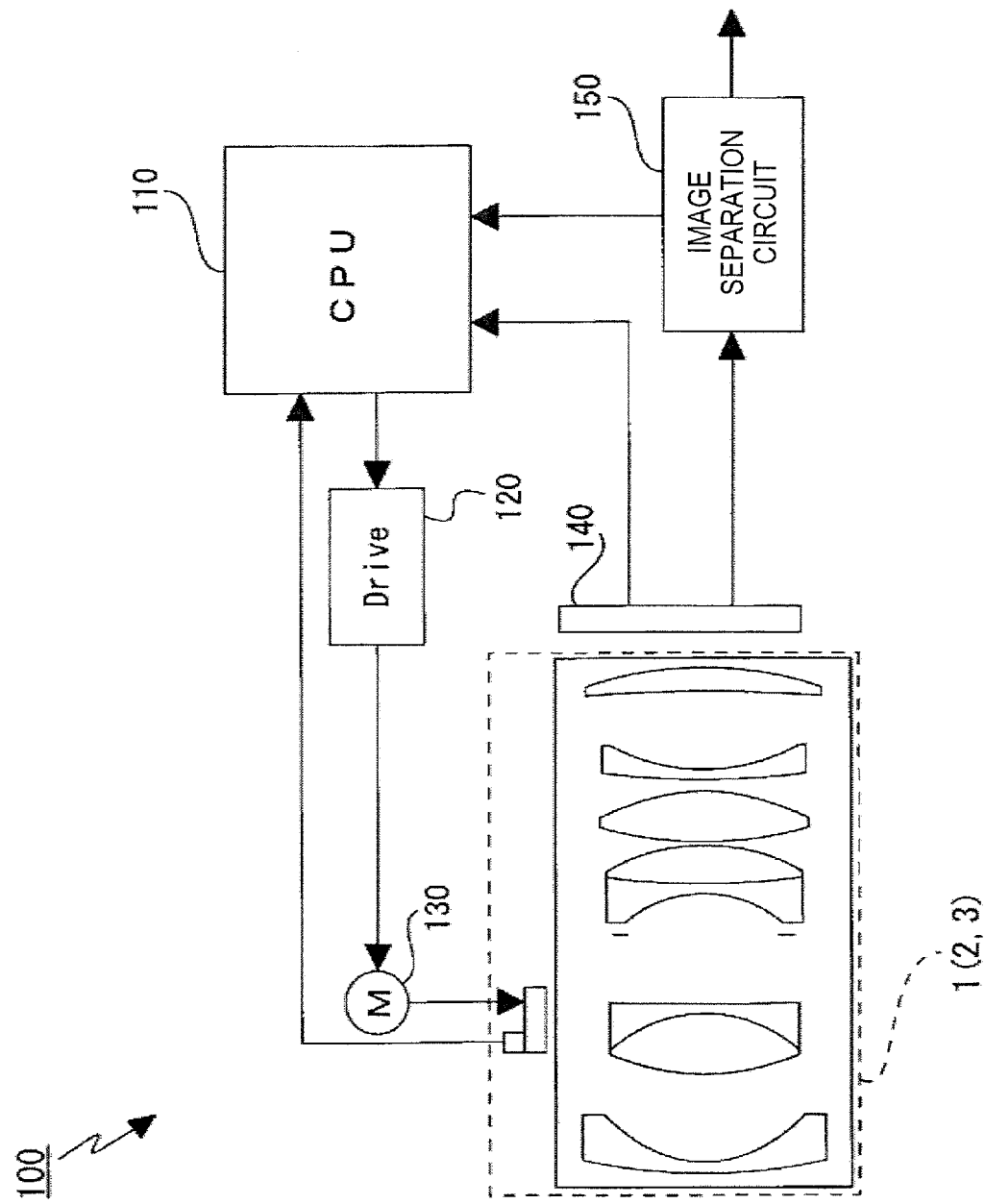
FIG. 10 is a block diagram illustrating an example of an imaging apparatus.

FIG. 10 is a block diagram illustrating a digital still camera as the imaging apparatus according to an embodiment of the present technology.

An imaging apparatus (digital still camera) 100 includes a central processing unit (CPU) 110 that controls the imaging apparatus 100 as a whole and an imaging element 140 that converts an optical image obtained by the above-described imaging lens 1 (2 or 3) into an electric signal and transmits the converted electric signal to an image separation circuit 150.

A photoelectric conversion element such as a charge coupled device (CCD) or a complementary metal oxide semiconductor (CMOS) is used as the imaging element 140.

The image separation circuit 150 generates a focus control signal based on the input electric signal, transmits the generated focus control signal to the CPU 110, and transmits an image signal corresponding to an image portion in the electric signal to an image processing circuit (not shown) of a rear stage. The image processing circuit converts the input image signal into a signal with a signal format suitable for subsequent processing and supplies the converted signal to perform an image display process of a display unit, a recording process on a predetermined recording medium, a data transmission process via a predetermined communication interface, and the like.

An operation signal of a focusing operation or the like is input to the CPU 110. The CPU 110 executes various processes in accordance with the input operation signal. For example, when a focusing operation signal is input through a focusing operation, the CPU 110 causes a driver circuit 120 to operate a driving motor 130 in order to realize a focus state in accordance with the operation signal. Accordingly, in the imaging apparatus 100, the fifth lens group GR5 of the imaging lens 1 (2 or 3) is moved in an optical axis direction through a process executed by the CPU 10. At this time, the CPU 110 gives feedback positional information of the fifth lens group GR5 and subsequently acquires reference information obtained in the movement of the second lens group GR2 via the driving motor 130.

In the imaging apparatus 100, only one driving system has been described to facilitate the description. However, the imaging apparatus 100 further includes a zoom system, a focus system, and a photographing mode switch driving system. Further, when the imaging apparatus 100 has a shake correction function, a vibration-proof driving system is further provided to drive a shake correction lens (group). At least a part of the vibration-proof driving system may be commonly used.

In the above-described embodiments, the case in which the imaging apparatus is applied to a digital still camera has been described, but the imaging apparatus is not limited to the digital still camera. The imaging apparatus is broadly applied to camera units or the like of digital input/output apparatuses such as digital video cameras, camera-embedded portable telephones, and camera-embedded personal digital assistants (PDAs).

Others

In the imaging apparatus and the imaging lens according to the embodiments of the present technology, a lens having substantially no lens power may be disposed or a lens group including such a lens may be disposed in addition to the first to sixth lens groups. In this case, the imaging apparatus and the imaging lens according to the embodiments of the present technology may actually include seven or more lens groups in addition to the first to sixth lens groups.

Present Technology

The present technology can also be configured as below.

<1> An imaging lens including:

a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

<2> The imaging lens according to <1>, wherein, in the positive lens of the sixth lens group, a curvature of a surface on the image side is greater than a curvature of a surface on the object side.

<3> The imaging lens according to <1> or <2>, wherein at least one surface of the positive lens of the fourth lens group is aspheric.

<4> The imaging lens according to any of <1> to <3>, wherein, in the negative lens of the fifth lens group, a curvature of a surface on the image side is greater than a curvature of a surface on the object side.

<5> The imaging lens according to any of <1> to <4>, wherein a lens closest to the object side is a negative meniscus lens.

<6> An imaging apparatus including:

an imaging lens; and an imaging element that converts an optical image formed by the imaging lens into an electric signal, wherein the imaging lens includes a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

<7> The imaging lens according to any of <1> to <5> or the imaging apparatus according to <6> further including a lens having substantially no lens power.

The shapes and numerical values of the units according to the above-described embodiments are merely examples to realize an embodiment of the present technology, and the technical scope of the present technology should not be construed as limited thereto.

It should be understood by those skilled in the art that various modifications, combinations, sub-combinations and alterations may occur depending on design requirements and other factors insofar as they are within the scope of the appended claims or the equivalents thereof.

The present technology contains subject matter related to that disclosed in Japanese Priority Patent Application JP 2011-171295 filed in the Japan Patent Office on Aug. 4, 2011, the entire content of which is hereby incorporated by reference.

What is claimed is:

1. An imaging lens comprising:

a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

2. The imaging lens according to claim 1, wherein, in the positive lens of the sixth lens group, a curvature of a surface on the image side is greater than a curvature of a surface on the object side.

3. The imaging lens according to claim 1, wherein at least one surface of the positive lens of the fourth lens group is aspheric.

4. The imaging lens according to claim 1, wherein, in the negative lens of the fifth lens group, a curvature of a surface on the image side is greater than a curvature of a surface on the object side.

5. The imaging lens according to claim 1, wherein a lens closest to the object side is a negative meniscus lens.

6. An imaging apparatus comprising:

an imaging lens; and an imaging element that converts an optical image formed by the imaging lens into an electric signal, wherein the imaging lens includes a fixed first lens group having a negative refractive power, a second lens group having a positive refractive power, a stop, a third lens group including a cemented lens, a fourth lens group including a positive lens, a fifth lens group serving as a focus group and including a negative lens, and a sixth lens group including a positive lens that are arranged sequentially from an object side to an image side.

* * * * *